(12) United States Patent
Nagami et al.

(10) Patent No.: US 8,415,073 B2
(45) Date of Patent: Apr. 9, 2013

(54) FUEL CELL AND ELECTRODE POWDER CONSTITUTING THE CATALYTIC LAYER THEREOF

(75) Inventors: Tetsuo Nagami, Nagoya (JP); Sozaburo Ohashi, Nagoya (JP); Yuichiro Sugiyama, Susono (JP); Mikihiro Hori, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/668,454

(22) PCT Filed: Jul. 18, 2008

(86) PCT No.: PCT/JP2008/063459
§ 371 (c)(1),
(2), (4) Date: Jan. 11, 2010

(87) PCT Pub. No.: WO2009/011464
PCT Pub. Date: Jan. 22, 2009

(65) Prior Publication Data
US 2010/0209808 A1 Aug. 19, 2010

(30) Foreign Application Priority Data
Jul. 19, 2007 (JP) .................. 2007-188465

(51) Int. Cl.
*H01M 4/02* (2006.01)
*B01J 35/00* (2006.01)

(52) U.S. Cl.
USPC ............... 429/523; 429/524; 502/4

(58) Field of Classification Search ........... 252/62.2, 252/182.1; 502/101; 429/400–535
See application file for complete search history.

(56) References Cited

U.S. PATENT DOCUMENTS
2007/0224479 A1 9/2007 Tadokoro et al.

FOREIGN PATENT DOCUMENTS

| CN | 1947289 | 4/2007 |
|---|---|---|
| EP | 1 748 509 A1 | 1/2007 |
| JP | 10-334922 | 12/1998 |
| JP | 2002-42824 | 2/2002 |
| JP | 2002-100367 | 4/2002 |
| JP | 2003-109643 | 4/2003 |
| JP | 2005-332807 | 12/2005 |
| JP | 2006-120335 | 5/2006 |
| WO | WO 2005/104275 A * | 11/2005 |

* cited by examiner

*Primary Examiner* — Maria J Laios
(74) *Attorney, Agent, or Firm* — Finnegan, Henderson, Farabow, Garrett & Dunner, LLP

(57) ABSTRACT

The present invention specifies the physical property valves of a catalytic layer correlating with the performance of a fuel cell, and provides the catalytic layer having the physical proper values and a fuel cell. Specifically, in a fuel cell having a membrane-electrode assembly provided with a catalytic layer 13 on each side of an electrolyte membrane 10, an electrode powder constituting the catalytic layer 13 shall have an amount of adsorbed water vapor in a range of 52 to 70 $cm^3(STP)/g$ by a value measured when the water-vapor partial pressure is 0.6, which is determined from the adsorption isotherm of water. The fuel cell having the catalytic layer with the use of the electrode powder having the amount of adsorbed water vapor in this range has the output performance of 0.6 $A/cm^2$ or higher by current density at 0.6 V, in a less humidified condition and a more humidified condition.

5 Claims, 2 Drawing Sheets

FUEL CELL AND ELECTRODE POWDER CONSTITUTING THE CATALYTIC LAYER THEREOF

CROSS-REFERENCE TO RELATED APPLICATIONS

This application is a national phase application of International Application No. PCT/JP2008/063459, filed Jul. 18, 2008, and claims the priority of Japanese Application No. 2007-188465, filed Jul. 19, 2007, the contents of both of which are incorporated herein by reference.

TECHNICAL FIELD

The present invention relates to a fuel cell and an electrode powder constituting the catalytic layer thereof

BACKGROUND ART

A solid polymer type fuel cell is known as one form of a fuel cell. The solid polymer type fuel cell works at a lower temperature (approximately −30° C. to 120° C.), can be manufactured at a lower cost, and can be more compactly formed than fuel cells of other forms, and accordingly is expected as a power source of an automobile or the like.

As is illustrated in FIG. 3, the solid polymer type fuel cell 1 includes a membrane-electrode assembly (MEA) 2 as a main component, and makes the membrane-electrode assembly sandwiched between an anode-side separator 20 provided with a fuel (hydrogen) gas channel 21 and a cathode-side separator 30 provided with an air (oxygen) channel 31 to form one fuel cell 1 which is referred to as a single cell. The membrane-electrode assembly 2 has a structure in which an anode-side electrode 15a formed of a catalytic layer 13a and a gas diffusion layer 14a in an anode side is stacked on one side of a solid polymer electrolyte membrane 10 which is an ion exchange membrane, and a cathode-side electrode 58b formed of a catalytic layer 13b and a gas diffusion layer 14b in a cathode side is stacked on the other side thereof.

The catalytic layer 13 is formed of an electrode powder containing a catalyst-carrying conductor which is a carbon powder having a platinum-based metal catalyst carried thereon, for instance, and of an electrolytic resin, and is formed by applying the above described electrode powder which has been formed into an ink state or a pasty state together with the solvent on an appropriate substrate, drying the film and transferring the dried film to the electrolyte membrane 10 with a hot press or the like. A carbon paper or a carbon cloth is mainly used for the gas diffusion layer 14.

The output performance of the fuel cell (membrane-electrode assembly) is dependent on various physical properties of the components, and it is known that among them, hydrophilicity (wettability to water) of the catalytic layer is an important factor. When the hydrophilicity is excessively low, the conductive path of a proton cannot be formed and the output performance decreases in a less humidified period. When the hydrophilicity is excessively high, a flatting phenomenon tends to easily occur and the output performance decreases in a more humidified period. For this reason, studies are conducted for the purpose of imparting appropriate hydrophilicity to the catalytic layer. Patent document 1 describes a solid polymer type fuel cell which makes the catalytic layer contain a water-retaining agent including such sulfuric acid or phosphoric acid as to promote proton migration in the catalytic layer, and enables the catalytic layer at least in the oxygen pole side to retain 1 to 10 (mg/cm$^2$) of a water content. In addition, Patent document 2 describes a solid polymer type fuel cell which is provided with an electrode catalytic layer containing a carbon black particle having a catalytic metal carried thereon and a polymer ion-exchange component (electrolytic resin), and which imparts such hydrophilicity that an amount of adsorbed water under a saturated water-vapor pressure at 60° C. is 150 cc/g or more to the above described carbon black particle constituting the catalytic layer.

[Patent document 1] JP Patent Publication (Kokai) No. 10-334922 A (1998)

[Patent document 2] JP Patent Publication (Kokai) No. 2002-100367 A (2002)

DISCLOSURE OF THE INVENTION

Problems to be Solved by the Invention

As described above, a conventional countermeasure technology relating to the hydrophilicity of a catalytic layer is that of determining the specific solution for individual cases of a hydrophilization method and a material such as methods of controlling the hydrophilicity by adding another substance like a water-retaining agent or controlling an amount of adsorbed water to the carbon black particle which is a catalyst-carrying conductor, under present conditions, and does not yet have such a quantitative evaluation index as to directly convert the hydrophilicity of the catalytic layer into numbers. For this reason, it is difficult to quantitatively describe the effectiveness of the countermeasure technology, and a method of verifying the effectiveness of the countermeasure technology which aims at the hydrophilicity stays at a level of qualitatively verifying the effectiveness by evaluating it while changing the evaluation condition such as a degree of humidification.

The present invention has been made with respect to the above described circumstances, and is directed at: determining a general quantitative evaluation index relating to the hydrophilicity of the catalytic layer, and thereby finding out a numeric range in which a high output performance is obtained; providing a catalytic layer for a fuel cell, which has physical properties in the numeric range; and disclosing the fuel cell provided with the catalytic layer.

Means for Solving the Problem

The present inventors have carried out many experiments and studies for solving the above described problems, and found out that amounts of adsorbed water vapor, which are determined from the adsorption isotherm of water, could be a quantitative evaluation index on the hydrophilicity of the catalytic layer, that the amount of adsorbed water vapor among them, which is determined from the adsorption isotherm of water on the electrode powder containing the catalyst-carrying conductor constituting the catalytic layer and the electrolytic resin, was preferable as the evaluation index, and that when the amount of adsorbed water vapor was within a predetermined range, the fuel cell provided with the catalytic layer showed a high output performance both in a less humidified state and a more humidified state.

The present invention has been made on the basis of such finding. The present invention according to claim 1 provides a fuel cell having a membrane-electrode assembly provided with a catalytic layer on each side of the electrolyte membrane, characterized in that an electrode powder constituting the catalytic layer has an amount of adsorbed water vapor in a range of 52 to 70 cm$^3$(STP)/g by a value measured when the water-vapor partial pressure is 0.6, which is determined from the adsorption isotherm of water. In addition, the present invention according to claim 2 provides an electrode powder constituting the catalytic layer in the membrane-electrode assembly of the fuel cell, characterized in that an amount of adsorbed water vapor is in a range of 52 to 70 cm$^3$(STP)/g by a value measured when the water-vapor partial pressure is 0.6, which is determined from the adsorption isotherm of water.

According to the present invention, an objective data relating to the hydrophilicity of the catalytic layer can be obtained merely by quantitatively measuring the above described amount of adsorbed water vapor of the above described electrode powder constituting the catalytic layer, with a conventional known method. In addition, the fuel cell manufactured by using the catalytic layer having the above described amount of adsorbed water vapor in the range of the present invention can show a high output performance both in a less humidified state and a more humidified state.

The electrolyte membrane constituting the membrane-electrode assembly in the present invention can employ an electrolytic resin which is used for an electrolytic membrane in the membrane-electrode assembly of a conventional solid polymer type fuel cell as it is, and includes, for instance, a perfluorocarbon-based polymer electrolyte and a hydrocarbon-based polymer electrolyte.

The electrode powder constituting the catalytic layer in the present invention is a mixture formed from an electrolytic resin and an electroconductive material (which includes carbon for instance, but is not limited thereto) having a catalyst (which includes platinum for instance, but is not limited thereto) carried thereon, and may employ an electrode powder which is generally used in a fuel cell, on conditions that the electrode powder has the above described range of the amount of adsorbed water vapor. The catalyst includes, for instance, Pt, PtCo and PtIrCo. The electrolytic resin may be the same as an electrolytic resin constituting the electrolyte membrane, and includes Nafion (brand name of product made by DuPont).

The electrode powder constituting the catalytic layer in the present invention has the amount of adsorbed water vapor in a range of 52 to 70 cm$^3$(STP)/g by a value measured when the water-vapor partial pressure is 0.6, which is determined from the adsorption isotherm of water. When the catalytic layer is formed by using an electrode powder having the amount of adsorbed water vapor, which deviates from this range, the output performance of the fuel cell decreases in a less humidified state and/or a more humidified state, which is not preferable.

DESCRIPTION OF SYMBOLS

1—Solid polymer type fuel cell, 2—Membrane-electrode assembly (MEA), 10—Solid polymer electrolyte membrane, 13—Catalytic layer, 14—Gas diffusion layer, 20 and 30—Separator

EXAMPLE

The present invention will be described below with reference to examples.

Figure 1:
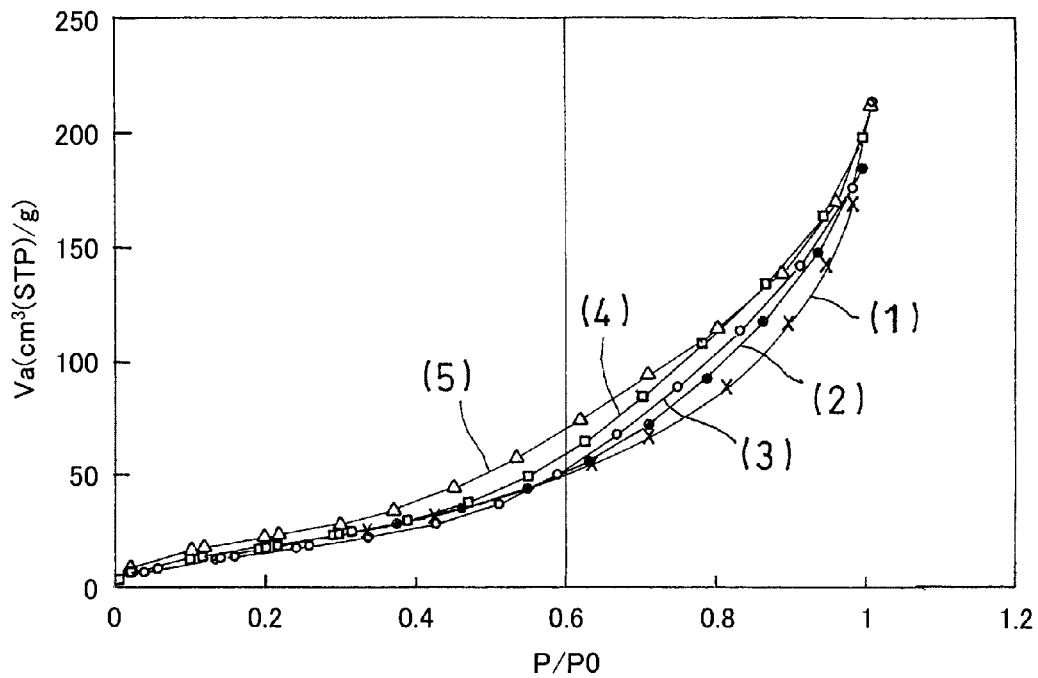
FIG. 1 is a graph showing a relationship between an amount of adsorbed water vapor, which is determined from an adsorption isotherm of water, and a water-vapor partial pressure, which has been obtained in an example.

(1) Five types of electrode powders were prepared which were formed of an electroconductive material that was a catalyst-carrying carbon and of an electrolytic resin (brand name: Nafion) as is shown in Table 1, and was cast on a Teflon sheet. After having been dried, the electrode powder was scraped out from the Teflon sheet, and an electrode powder sample was obtained in a powder state. The powder was held in a vacuum at 120° C. for 8 hours as a pre-treatment, and adsorbed water was released and removed. The sample was controlled at a temperature of 50° C., and the amount of water vapor adsorbed to the sample, which varies with the change of a water-vapor partial pressure, was determined while the pressure was gradually increased. Then, the graph of the adsorption isotherm of water was obtained as shown in FIG. 1. The amount of adsorbed water vapor Va (cm$^3$(STP)/g) of each sample obtained when the water-vapor partial pressure was 0.6 (P/Po) was shown in Table 1. In the above, STP means a standard value. In addition, the water-vapor partial pressure of 0.6 was selected as a representative point in a region in which the amount of adsorbed water vapor linearly increased, and the amount of adsorbed water vapor Va at the point was determined.

TABLE 1

| Electrode powder | Catalyst type | Mass ratio of electrolytic resin to carbon | Va (cm$^3$(STP)/g) |
|---|---|---|---|
| 1 | PtIrCo | 0.75 | 48.9 |
| 2 | PtCo | 0.75 | 51.9 |
| 3 | PtIrCo | 0.75 | 53.0 |
| 4 | PtCo | 0.75 | 59.6 |
| 5 | PtIrCo | 0.75 | 70.9 |

(2) The catalytic layer was formed on a transfer substrate by using each of the five electrode powders, and was transferred onto the electrolyte membrane with a transferring method. Then, a carbon paper was staked thereon as a diffusion layer to form a membrane-electrode assembly. Each membrane-electrode assembly was subjected to a power generation test on the same condition. The maximum current density (A/cm$^2$ at 0.6 V) was measured for each membrane-electrode assembly on a less humidified condition and a more humidified condition. The result was shown in Table 2 and FIG. 2.

TABLE 2

| Electrode powder | Va (cm$^3$(STP)/g) | High humidification (A/cm$^2$ 0.6 V) | Low humidification (A/cm$^2$ 0.6 V) |
|---|---|---|---|
| 1 | 48.9 | 0.858 | 0.539 |
| 2 | 51.9 | 0.971 | 0.413 |
| 3 | 53.0 | 1.253 | 0.930 |
| 4 | 59.6 | 1.236 | 0.975 |
| 5 | 70.9 | 0.989 | 0.539 |

Figure 2:
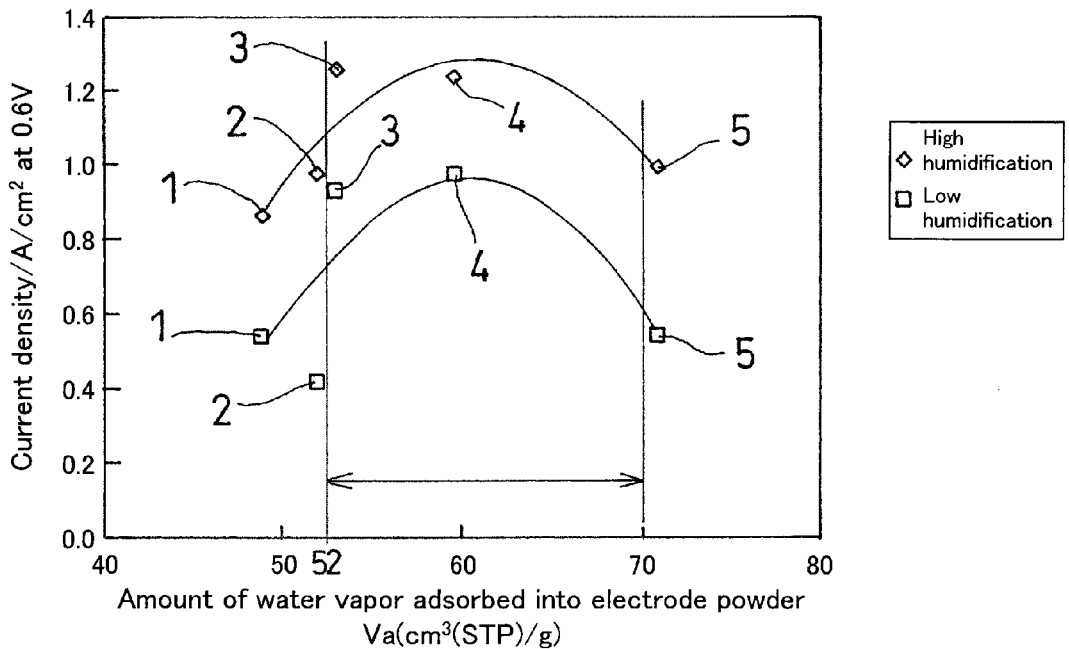
FIG. 2 is a graph showing a correlation between an amount of adsorbed water vapor to an electrode powder and a current density.
Figure 3:
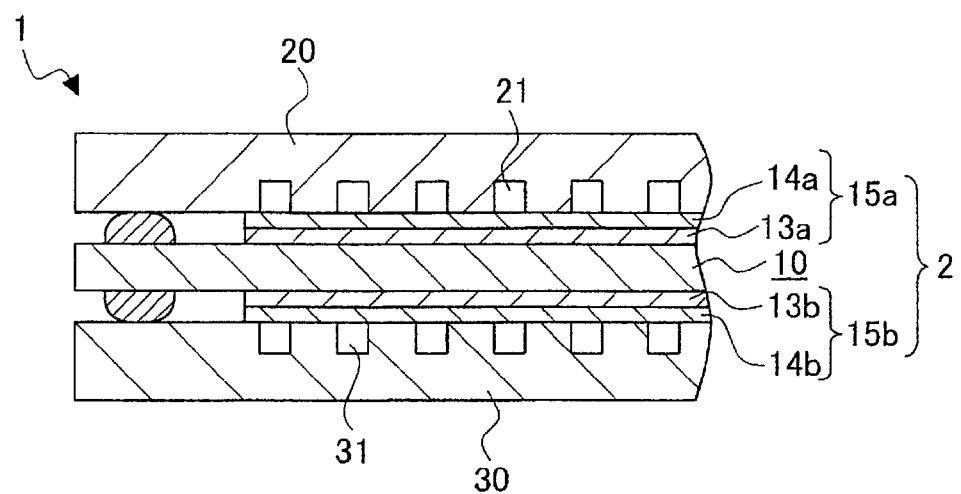
FIG. 3 is a view for describing one example of a fuel cell.

(3) As is illustrated in FIG. 2, the current density which is output from the fuel cell varies depending on the amount of adsorbed water vapor Va to the electrode powder. However, the current density has correlation with the amount of adsorbed water vapor Va, and the change value does not depend on the type of the electrolytic resin and the electroconductive material having the catalyst carried thereon, which constitute the electrode powder, but simply depends only on the amount of adsorbed water vapor Va. Accordingly, it is understood that the amount of adsorbed water vapor Va, which is determined from the adsorption isotherm of water, can be adopted as a general and quantitative evaluation index concerning the hydrophilicity of the catalytic layer, which decides the output performance of the fuel cell.

The fuel cell is generally required to output a current density of 0.6 A/cm² or higher at 0.6 V, as a standard output performance. Then, it is understood from Table 1, Table 2 and FIG. 2 that powder materials 3 and 4 satisfy the standard of the output performance, but that the electrode powders 1, 2 and 5 show the current density of 0.6 A/cm² or lower at 0.6 V on a less humidified condition. In other words, it is understood that the electrode powders 1, 2 and 5 are not such electrode powders as to sufficiently satisfy the standard. Accordingly, it is understood that when the electrode powder has the amount of adsorbed water vapor in a range of 52 to 70 cm³(STP)/g by a value measured when the water-vapor partial pressure is 0.6, which is determined from the adsorption isotherm of water, an obtained fuel cell (solid high polymer type fuel cell) has an output performance of a standard level or higher.

In addition, the present inventors measured the amount of adsorbed water vapor from the adsorption isotherm of water on the five powders of an electroconductive material which is a catalyst-carrying carbon constituting the electrode powder, in the same way as in the case of the above described electrode powder, and determined the correlation between the measured amount of adsorbed water vapor and the current density of the fuel cell which was manufactured by using the powder, but the correlation as illustrated in FIG. 2 was not obtained. This can be an evidence of the fact that the performance of the fuel cell is determined by physical properties of an electrode (electrode powder).

Thus, in the present invention, physical properties of the electrode, which correlate with the performance of the fuel cell, could be specified. The fruit will largely contribute to the acceleration of development in the future.

The invention claimed is:

1. A fuel cell having a membrane-electrode assembly provided with a catalytic layer on each side of the electrolyte membrane, wherein an electrode powder constituting the catalytic layer is a mixture formed of an electrolytic resin and an electroconductive material having a catalyst carried thereon, and has an amount of adsorbed water vapor in a range of 52 to 70 cm³(STP)/g by a value measured when the water-vapor partial pressure is 0.6, which is determined from the adsorption isotherm of water.

2. The fuel cell according to claim 1, wherein the electrode powder has a catalyst comprising any one of PtCo and PtIrCo, and wherein the mass ratio of an electrolytic resin to carbon is 0.75.

3. The fuel cell according to claim 1, wherein the largest current density in a power-generating period is 0.6 A/cm² or higher at 0.6 V.

4. An electrode powder constituting the catalytic layer in the membrane-electrode assembly of the fuel cell, wherein the electrode powder is a mixture formed of an electrolytic resin and an electroconductive material having a catalyst carried thereon, and has an amount of adsorbed water vapor in a range of 52 to 70 cm³(STP)/g by a value measured when the water-vapor partial pressure is 0.6, which is determined from the adsorption isotherm of water.

5. The electrode powder according to claim 4, wherein the electrode powder has a catalyst comprising any one of PtCo and PtIrCo, and wherein the mass ratio of an electrolytic resin to carbon is 0.75.

* * * * *